United States Patent
Copeland et al.

(10) Patent No.: US 6,782,538 B1
(45) Date of Patent: *Aug. 24, 2004

(54) OBJECT ORIENTED INFORMATION HANDLING SYSTEM INCLUDING AN EXTENSIBLE INSTANCE MANAGER

(75) Inventors: George Prentice Copeland, Austin, TX (US); Geoffrey Martin Hambrick, Round Rock, TX (US); Robert Howard High, Jr., Round Rock, TX (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 752 days.

(21) Appl. No.: 08/572,474
(22) Filed: Dec. 14, 1995
(51) Int. Cl.$^7$ ............................... G06F 9/44
(52) U.S. Cl. ............................... 719/315
(58) Field of Search ............... 395/680, 683; 709/300, 303, 330, 315, 316, 310

(56) References Cited

U.S. PATENT DOCUMENTS 4,525,780 A  6/1985  Bratt et al. ............... 364/200
4,814,971 A  3/1989  Thatte ............... 364/200

(List continued on next page.)

FOREIGN PATENT DOCUMENTS

EP  0817024 A2 * 12/1997

OTHER PUBLICATIONS

OMG, The Common Object Request Broker: Architecture and Specification, Dec. 1991, p. 147–158.*
Next Computer Inc., IDL Objective—C Language Mapping Specification, Apr. 23, 1995 p. 1–11.*
S. Radia, et al, The Spring Naming Service, Sun Microsystems, Laboratories, Inc., pp. (26), Nov. 1993.*
Jon Siegel, Common Object Services Specification, vol. 1, OMG Document No. 94–1–1, 3/94, p. 65–88.*

Primary Examiner—Sue Lao
(74) Attorney, Agent, or Firm—Andrea Pair Bryant; David A. Mims, Jr.; Mark S. Walker

(57) ABSTRACT

A system for efficiently generating keys for subsequently objects during object creation and for finding and activating objects using the generated keys in an object oriented system includes one or more processors, a storage system, one or more I/O controllers, a system bus, operatively connecting the processors, the storage system and the I/O controllers, a system control program for controlling the operation of the system, and an extensible instance manager which generates keys and manages instances of objects under the control of the system control program.

3 Claims, 2 Drawing Sheets

U.S. PATENT DOCUMENTS

| | | | |
|---|---|---|---|
| 4,853,842 A | 8/1989 | Thatte et al. | 364/200 |
| 4,989,132 A | 1/1991 | Mellender et al. | 364/200 |
| 5,008,786 A | 4/1991 | Thatte | 364/200 |
| 5,016,162 A | 5/1991 | Epstein et al. | 364/200 |
| 5,043,871 A | 8/1991 | Nishigaki et al. | 364/200 |
| 5,047,925 A | 9/1991 | Kun et al. | 364/200 |
| 5,075,845 A | 12/1991 | Lai et al. | 395/425 |
| 5,093,914 A | 3/1992 | Coplien et al. | 395/700 |
| 5,095,480 A | 3/1992 | Fenner | 370/94.1 |
| 5,111,413 A | 5/1992 | Lazansky et al. | 364/578 |
| 5,136,712 A | 8/1992 | Perazzoli, Jr. et al. | 395/700 |
| 5,163,148 A | 11/1992 | Walls | 395/600 |
| 5,185,885 A | 2/1993 | Dysart et al. | 395/600 |
| 5,218,699 A * | 6/1993 | Brandle et al. | 395/650 |
| 5,261,052 A | 11/1993 | Shimamoto et al. | 395/200 |
| 5,265,221 A | 11/1993 | Miller | 395/725 |
| 5,276,872 A | 1/1994 | Lomet et al. | 395/600 |
| 5,280,610 A * | 1/1994 | Travis, Jr. et al. | 395/600 |
| 5,283,830 A | 2/1994 | Hinsley et al. | 380/25 |
| 5,287,453 A | 2/1994 | Roberts | 395/200 |
| 5,291,283 A | 3/1994 | Kondo et al. | 348/390 |
| 5,295,256 A | 3/1994 | Bapat | 395/500 |
| 5,297,279 A | 3/1994 | Bannon et al. | 395/600 |
| 5,297,283 A | 3/1994 | Kelly, Jr. et al. | 395/650 |
| 5,301,286 A | 4/1994 | Rajani | 395/400 |
| 5,303,375 A | 4/1994 | Collins et al. | 395/650 |
| 5,321,841 A | 6/1994 | East et al. | 395/725 |
| 5,325,524 A * | 6/1994 | Black et al. | 395/683 |
| 5,335,323 A | 8/1994 | Kolnick | 395/164 |
| 5,341,478 A | 8/1994 | Travis, Jr. et al. | 395/200 |
| 5,343,554 A | 8/1994 | Koza et al. | 395/13 |
| 5,363,313 A | 11/1994 | Lee | 364/491 |
| 5,369,702 A | 11/1994 | Shanton | 380/4 |
| 5,369,778 A | 11/1994 | San Soucie et al. | 395/800 |
| 5,377,323 A * | 12/1994 | Vasudevan | 395/200 |
| 5,379,432 A | 1/1995 | Orton et al. | 395/700 |
| 5,404,506 A | 4/1995 | Fujisawa et al. | 395/600 |
| 5,404,508 A | 4/1995 | Konrad et al. | 395/600 |
| 5,404,529 A | 4/1995 | Chernikoff et al. | 395/700 |
| 5,408,649 A | 4/1995 | Beshears et al. | 395/575 |
| 5,412,774 A | 5/1995 | Agrawal et al. | 395/157 |
| 5,414,840 A | 5/1995 | Rengarajan et al. | 395/600 |
| 5,421,012 A | 5/1995 | Khoyi et al. | 395/650 |
| 5,421,015 A | 5/1995 | Khoyi et al. | 395/650 |
| 5,437,027 A | 7/1995 | Bannon et al. | 395/600 |
| 5,682,534 A * | 10/1997 | Kapoor et al. | 395/684 |
| 5,692,183 A * | 11/1997 | Hapner et al. | 395/500 |
| 5,721,909 A * | 2/1998 | Oulid-Aissa et al. | 395/600 |
| 5,809,506 A * | 9/1998 | Copeland | 707/103 |
| 5,991,823 A * | 11/1999 | Cavanaugh, III et al. | 709/304 |

* cited by examiner

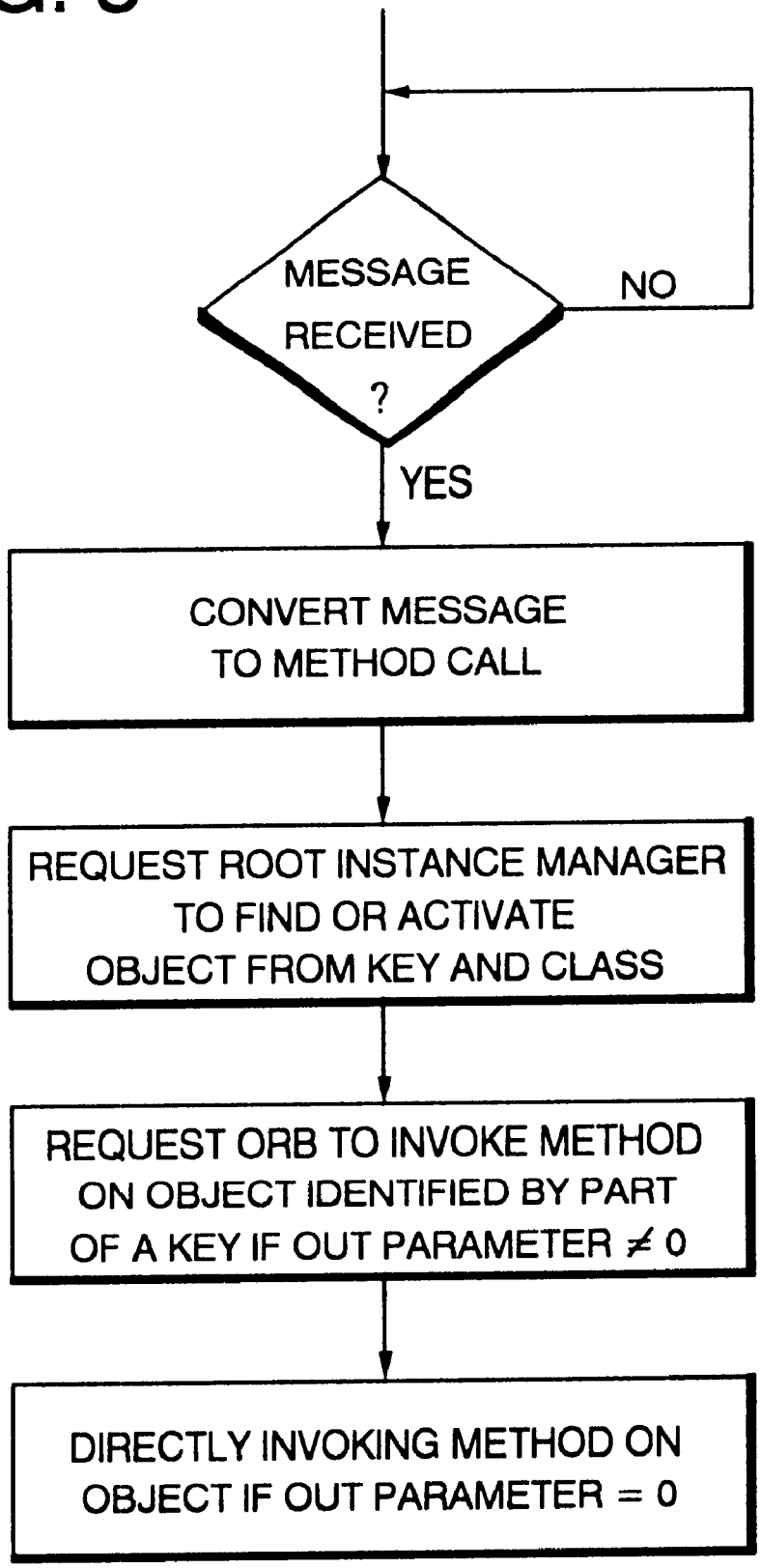

OBJECT ORIENTED INFORMATION HANDLING SYSTEM INCLUDING AN EXTENSIBLE INSTANCE MANAGER

BACKGROUND OF THE INVENTION

1. Field of the Invention

The present invention relates to information handling systems, methods and articles of manufacture, and more particularly to information handling systems and methods for generating keys for objects and for locating and activating objects from the keys in an object oriented system.

2. Prior Art

In the prior art there are many techniques for improving object oriented programming systems (OOPS).

The following are examples of the prior art.

U.S. Pat. No. 5,093,914 generally teaches a method used by a digital computer in controlling execution of an object oriented program to effect a defined action, for example, stopping the program when a specified virtual function is invoked on a specified object during execution of the program.

Although the patent generally deals with methods for controlling execution of object oriented programs, the patent does not teach nor suggest in an object oriented system as is taught and claimed herein with reference with the present invention.

U.S. Pat. No. 5,343,554 teaches a computing system in which problems are solved by a process which includes creating objects of first and second classes wherein the second class objects are externally invocable and where the externally invocable sub-class objects include an indication of an internally invocable sub-class object and executing the class of objects wherein one externally invocable sub-object invokes the internally invocable sub-object and a new object of the first class is generated in response to the results.

Although the patent deals generally with the use of object oriented systems including classes and sub-classes for solving problems, the patent does not teach nor suggest in an object oriented system as is taught and claimed herein with reference with the present invention.

There is a need for an efficient technique for generating keys for objects and for finding and activating objects from the generated keys.

An overall goal in object oriented programming systems is the development of program objects which can be reused easily.

The importance of binary code over source code increases with the degree of reuse. A main purpose of object oriented technology is code reuse. For object oriented technology to achieve large scale success, binary code reuse is essential. As the state of the art moves towards applications built from object formats which can be tailored and plugged into each other, binary code is critical.

The Object Management Group (OMG) is currently defining a set of interfaces for object system services named Common Object Services.

SUMMARY OF THE INVENTION

It is an object of the present invention to efficiently keys so generated for objects when creating objects and for subsequently finding and activating objects from the generated keys in an object oriented system.

Accordingly, a system for efficiently generating keys for objects and for finding and activating objects from the generated keys in an object oriented system includes one or more processors, a storage system, one or more I/O controllers, a system bus, operatively connecting the processors, the storage system and the I/O controllers, a system control program for controlling the operation of the system, and an extensible instance manager which generates keys and manages instances of objects under the control of the system control program.

It is an advantage of the present invention that keys may be efficiently generated for objects and objects may be found and activated from the generated keys in an object oriented system.

BRIEF DESCRIPTION OF THE DRAWINGS

FIG. 3 is a flow chart of the operation of an instance manager in accordance with the present invention.

DETAILED DESCRIPTION OF A PREFERRED EMBODIMENT OF THE INVENTION

Figure 1:
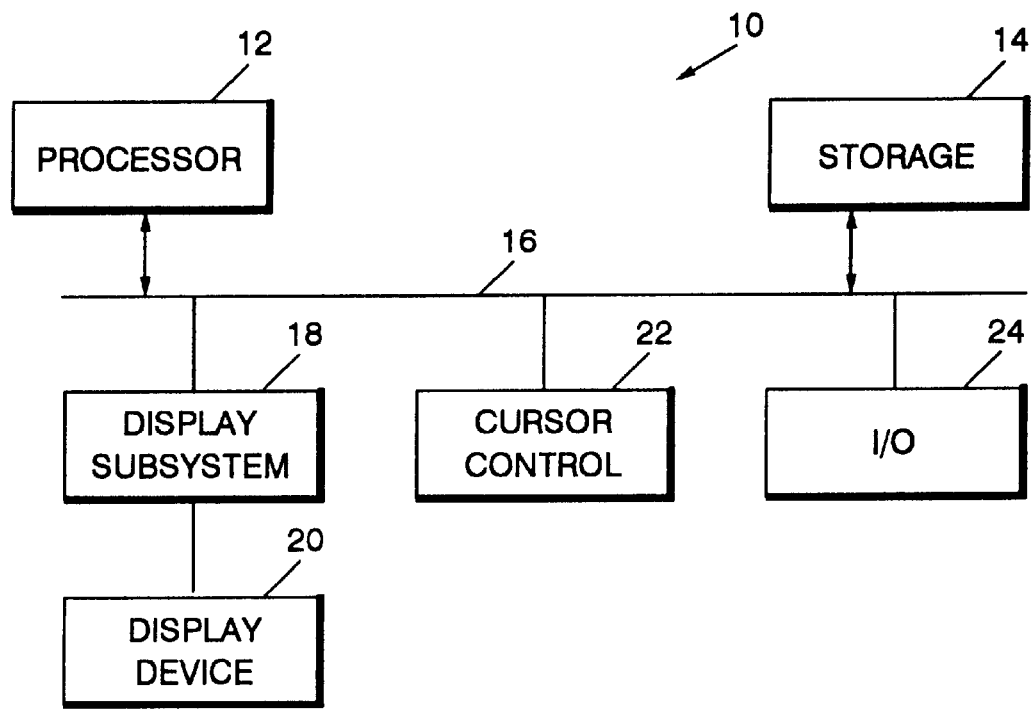
FIG. 1 is a block diagram of a system for executing the method according to the present invention.
Figure 2:
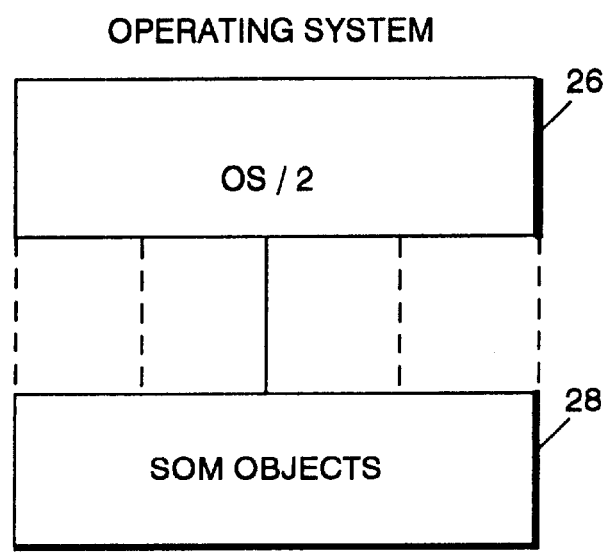
FIG. 2 is a block diagram showing the operating system platform and system object model program supporting the present invention.

Referring now to FIGS. 1 and 2, an information handling system 10 and an operating system environment for the present invention will be described.

Information handling system 10 may be a graphics work station or the like with a very powerful processor 12, a storage system 14, a system bus 16, display sub-system 18 controlling a display device 20, a cursor control device 22, and an I/O controller 24, all connected by system bus 16. The information handling system 10, shown in FIG. 1 may be operated by a commercially available well known multitasking operating system such as OS/2* (OS/2 is a registered trademark of International Business Machines Corporation). Among many tasks which the OS/2 operating system controls in operating information handling system 10, is execution of a program SOMObjects, which is a commercially available product of International Business Machines Corporation.

The method and article of manufacture of the present invention may be incorporated in the SOMObjects program.

An instance manager according to the present invention performs the following functions:

(a) Separates instance management from distribution. This means that persistent identifiers do not have to be full stringified references (as defined below) when distribution is not needed;

(b) Separates instance management from local method invocation. This allows instance management techniques to be changed independent of local method invocation;

(c) Allows different instance manager techniques to co-exist in a same address space where each instance manager manages its instances independent of others;

(d) Allows different local object request brokers (ORB) to co-exist in a same address space where each can interpose prior to method invocation whatever is required to manage its instances;

(e) Supports dynamically adding new instance manager techniques without rebooting the address space with a new instance manager;

(f) Supports instance managers for groups of similar instances to factor common metadata (for example, persistent IDs);

(g) Supports instance managers for local ORBs for groups of instances to also be application objects (for example, a collection or naming context).

For ease of understanding of the present invention, some terms will be defined as follows:

Stringified References

The stringified reference (SR) structure is

<org_tag, server_id, key, class_id>

The org_tag is provided by OMG to distinguish between SRs of different organizations.

The server_id identifies the server.

The key is a path of component keys (ckeys), much like a Name Service path (a NS Name is a path of component names) except that the key is the identity of the object within the server instead of a human-oriented name. For the purposes of this description, a "/" is used as a separator between ckeys in a key. This alone can be used as a persistent reference when persistence is needed without distributed references.

In general, anything in the SR becomes fragile (i.e., cannot be changed without invalidating outstanding (SRs). To allow the object to be moved between servers without invalidating outstanding SRs, an indirection can be used. The server_id/key pair could be replaced by a uuid which is mapped onto the server_id/key.

The class_id allows a proxy to be built from a SR without going to the object's server. It also eliminates the instance manager (IM) from having to remember the class_id for activation.

A SR is transparent to users. That is, users do not know or depend on the internal format of a SR or any part of it.

Object Adapter (OA)

An Object Adaptor (OA) according to the present invention includes instance management.

Each address space has a single OA and a single root IM. The OA does the following: (See FIG. 3)

1) Wait for messages.
2) Demarshall message into a method call.
3) Ask the root IM to find or activate the object given the key and class in the SR via key_to_ptr(key, class, rest_of_key);

The kind OUT parameter indicates whether the ptr is a regular object or Request Object Broker (ORB).

4) If the OUT parameter rest_of_key is not NULL, then the ptr returned is a ORB. In this case, ask the ORB to invoke the method on the object identified by the rest_of_key via dispatchMethod(rest_of_key, method_ID, in_va_list, out_va_list);

Else, invoke the method directly.

5) Marshall the return method call into a return message. For any object that is a return parameter, call the object's ptr_to_key() method to get its key to build a SR for the object.
6) Send return message.

Object Identity

Object creation and activation are often confused.

Object creation creates a new object identity. An individual object is created only once. This identity lives until the object is destroyed. These create and destroy events are explicitly triggered as part of the application. An object's identity is the only thing about an object guaranteed to never change, so it makes an object the same object even if its class and all of its state changes.

Object activation brings an already existing object into memory, so it can only happen to an object that was previously created and has not yet been destroyed and can happen many times during the object's lifetime. Activation does not create a new object identity. These activation and deactivation events are triggered by the underlying system to conserve computer resources.

Full object identity support includes both of the following:

The distributed ORB generates distributed object references and ensures that operations on different references for the same object are invoked on the same object. For an incoming operation, the ORB either finds the already activated object or activates it. The OA provides the address space id (org_key, server_id), and the IM provides the object id within the address space (key).

The IdentifiableObject implementation allows a client to find out if two object references are to the same object.

The first of these provides the most important aspect of object identity. Sometimes people equate IdentifiableObject with object identity when it is the ORB that is doing most of it.

Persistence of an object's references and persistence of an object's state are often confused. OMG separates these notions.

Persistence of the object's reference is provided by the ORB. This ensures that a reference to an object from outside the object's address space works across lifetimes of the object's address space. Upon receiving a remote method invocation, the ORB is responsible for ensuring that the target object's address space (i.e., its server) is activated and that the object is activated.

Persistence of the object's state is provided by any number of mechanisms, including a single-level store, the Persistent Object Service, etc.

These two mechanisms interact only when a persistent object A's state includes a reference to another persistent object B, where storing A's state includes storing a persistent version of its reference to B.

An object may have a persistent reference even if it has no persistent state. For example, a printer server semantics is that the print job has to be resubmitted if its address space goes down, so it has no persistent state to maintain. However, if a new print job is issued using a remote reference, the ORB is responsible for activating the address space and the object and invoking the method.

Instance Manager (IM) Function

An IM is responsible for supporting part of object identity within a server. It must generate keys for objects that can later be used to find/activate the object within that address space. For an object with a transient reference, IM does not have to remember anything persistently. For an object with a persistent reference, IM must persistently remember whatever it needs to find/activate the object.

If the object is active, IM must find the object instead of activating another object. To do this, it must typically transiently remember the key-to-pointer association.

In addition to having a persistent reference, if the object also has persistent state, then activation includes reinstating the object's state. To do this, the IM may need to persistently remember the association between key and where the object's state is located, as well as how to get it from and attach it to the object.

If the persistent object also has an access control group, then activation includes reinstating the object's group id. To do this, the IM must persistently remember the association between the object's key and group id, as well as how to get it from and attach it to the object.

There are advantages and disadvantages to keeping the object's class_id in the SR. If it is in the SR, then the IM's key_to_ptr() operation must include the class_id. If it is not in the SR, then the IM must persistently remember the association between the object's key and class_id.

There may be other metadata required to activate the object (i.e., required to be set prior to sending the first method to the object). Our current design for automatically inserting object services into an object to include everything in the object's class, so there is nothing else for the IM to persistently remember.

An example, of implementation of obj→ptr_to_key( ) would include the following code:

pid=obj→_get_pid( );

pidstr=pid→get_PIDString( );

ensure <key, pidstr> is stored in persistent table;

The implementation of key_to_ptr(key, class_id) would include the following activation code:

e=find entry for key in persistent table;

cobj=get class object from class_id;

obj=cobj→somNew( );

pidstr=get pid string from e;

pid=pid_factory→create(pidstr);

obj→_set_pid( );

For a user obj→_set_pid(pid2), in addition to changing the object's pid attribute the IM would change its pid if it had already persistently stored one for that object.

Object Request Broker (ORB) Function

An ORB has more responsibility for an object than an IM, in that it invokes the method on the object. This additional control can be used for doing something prior to invoking a local method. Some useful examples are:

Cache management for very large numbers of objects needs to reclaim space for a victim object without having to leave behind a proxy that gets the object-back so that methods on the victim object work correctly.

Security capabilities previously given out can be enforced. For example, a microkernel file server ORB directory→open(filename, readonly) can check access rights and return a port to the file object. When a file→write( ) is issued, the file server ORB-can verify whether a write operation has been approved prior to invoking the method.

It can be a front end to a cluster of workstations or to a MultiProcessor System operating under the IBM MVS operating system for a high throughput. It might include load balancing among the processors.

It can be a front end to another library ORB such as Smalltalk, which has its own threads, its own dictionary for instance management, and its own method dispatch.

Interfaces and Implementation

An IM has the following interface:

```
typedef string CKey; // component key
typedef string Key; // path of CKey's
interface IM : Object {
    Object key_to_ptr(in Key key, in ClassID class,
        out BindingType btype,
        out Key rest_of_key)
    void add_object(in CKey key, in Object obj) ;
    void add_IM(in Ckey key, in IM im) ;
    void add_ORB(in CKey, in ORB orb) ;
    void remove_where_ptr(in Object o) ;
    void remove_where_key(in CKey ckey) ;
    void list_elements(out IMIterator i) ;
} ;
```

Of course, a particular IM or ORB could also mix in other things like a Factory or a Collection or a NamingContext if it needs to serve other roles.

The ORB has the following interface:

```
interface ORB : Object {
    attribute IM rootIM;
        void dispatchMethod(in Key rest_of_key,
            in somId method_ID,
            in va_list ap,
            out somToken retvalue) ;
    {
```

Except for the OA and the root IM, every object must have a single IM. Except for the OA, every object must support the following interface:

IM _get_IM( );

Key ptr_to_key( );

The ptr_to_key( ) returns the object's key so that a SR can be built. The _get_IM( ) returns the object's IM, which is used, among other things, to implement ptr_to_key( ). An object's IM must be named during object creation. This could be implied if the IM, is the Factory. The Factory has to ensure that the object has the correct implementation for its ptr_to_key( ) method.

This key c an be used as a persistent reference when distribution is not needed.

Notice that a IM::add_element( ) can include another IM or another ORB. We allow these to form a pure tree (because these are intended to support object identity, this is restricted to a pure tree) with a single root in each server. This identity tree is typically much shallower than a Name Service directed graph, because deep identity paths are typically fragile.

The IM::key_to_ptr(key, class, btype, rest_of_key) implementation is similar to the NamingContext::resolve (namepath):

```
pop_ckey(key, first_ckey, rest_key); // in,out,out
binding = search for the object locally for first_key;
if (rest_key= =NULL// binding.type= =ORB) {//stop recursion
    btype = binding.type;
    rest_of_key = rest_key;
    return binding- >obj;
}
if (binding.type= =IM) // recurse to next IM
    return obj- > key_to_ptr(rest_key, class,
        btype, rest_of_key) ;
```

If the returned binding type is ORB, then the current OA or ORB asks the returned ORB to invoke the method identifying the target object via the returned rest_of_key.

The Object::ptr_to_key( ) implementation starts at a leaf object and recursively traverses up the tree to the root IM when the recursion stops and the ckeys are concatenated along the way back down to the target object where the complete key is returned.

An IM manages object identity for its own objects. An IM can also be a user object if it both is visible to the user and manages its identity (e.g., a collection or NamingContext).

Example Implementations of IM

There are several implementations of IM that may be effectively employed in an embodiment of the present invention:

IM_Root: There is one of these in a server, so that the OA knows on whom to call the key_to_ptr( ) method to get a pointer to an object for an incoming message. Typically, the only objects that this manages are other IMs like the ones described below. However, we could include in IM_Root support for legacy transient SRs (described below in IM_Transient).

IM_Transient: This handles transient objects. The key for a transient object might be transient_id/pointer.

A pointer may be used. This approach may cause a problem if the object is destroyed and a subsequent method is invoked on it.

IM_ODI: The key for an ODI object would be odi_id/database_name,segment_name,offset.

This IM simply calls the ODI runtime to find the object given the database_name,segment_name,offset. This IM does not have to persistently remember anything because the ODI runtime remembers everything. It is really just a wrapper around (or gateway to) the ODI runtime to provide our standard spelling. The ODI runtime is actually its own local persistent ORB, because it supports both persistent references as well as persistent state. This is true of any Object Oriented Data Base (OODB) because they support persistent objects instead of just persistent data.

IM_POS: This IM supports persistent references for objects whose persistent state is managed by Persistent Object Service (POS). The key for a POS object might be pos_id/pos_ckey When POS objects are activated, they are not restored immediately. Instead, the activation only includes creating an instance of the correct class and setting the pid attribute. They are restored in the Before method of the first method during a transaction. This mechanism handles lazy activation for these objects.

IM_Collection: This IM is a keyed collection (similarly for a NamingContext) where each element's data is stored in a record in a large record file or database. If the collection itself is a POS object, then the key for one of its elements might be pos_id/pos_ckey/element_ckey where the pos_ckey is for the collection and the element_ckey is the record key in the file or database. The collection object is always activated before the element. A generic collection can be provided that is connected to the database by telling the collection the element's class and pid. This provides scalability for very large (e.g., 10-9 element) collections by using the database's persistent notion of identity (i.e., the record key). The price for this scalability is that the object's SR is as fragile as the database's notion of identity. Relational databases typically provide a flattened id space for each table (corresponding to a collection), where each record key has a primary key that is unique within the table, so that the element object key would have only 3 ckeys in its path. For an IMS database, a longer path may sometimes be needed. The generic collection would implement a cache (e.g., 10-3) of the element object.

IM_ActivationGroup: Sometimes it is more efficient to group multiple objects together with a single pid so that they will be stored and restored together. The best grouping depends on the database schema and the access frequencies. One way to handle this is to have the root object that has the pid be a IM_ActivationGroup. An element object key might be pos_id/pos_ckey/group_member_ckey where the pos_ckey is for the root object. The root object (the IM_ActivationGroup) acts as the resource manager for its members:

Whenever a group member is activated, the root object is always activated first.

Whenever a group member participates in a transaction, it registers its root object with the transaction manager.

Whenever a group member is locked, it locks its root object which locks the whole group.

Whenever a group member is stored/restored, it stores/restores the root object which restores the whole group with its single pid.

The root object is obtained via_get_IM( ).

When an OpenDoc document Da's part P1 is exposed outside of Da, then P1's identity is relative to Da. That is, Da acts as a IM for P1 (a IM_OpenDoc). For example, if P1 were shared by another document Db, then Db's reference to P1 would include something like Da_key/P1_OID, where Da-Key is a path that is determined by what kind of object Da is. For example, Da_Key might be pos_id/pos_ckey3.

An example IM tree is illustrated below:

- o server's IM_Root
  - o transient_id --> IM_Transient object
    - o pointer1 --> a transient object
    - . . .
    - o pointerN --> a transient object
  - o odi_id --> IM_ODI object
    - o db1,segA,offset1 --> an ODI object
    - . . .
    - o dbN,segZ,offsetM --> an ODI object
  - o pos_id --> a IM_POS object
    - o pos_ckey1 --> a simple Pos object
    - . . .
    - o pos_ckeyN --> a simple Pos object
    - o pos_ckeyM -->a IM_Collection object

```
            o   dblkey1 --> a collection element object
            ...
            o   dlbkeyN --> a collection element object
       ...
       o    pos_ckeyO --> a IM_Collection object
            o   dblkey1 --> a collection element object
            ...
            o   dblkeyN --> a collection element object
```

The following describes how to implement the ptr_to_key( ) method. The generic implementation is a recursive call up the IM tree:

```
Key ptr_to_key( ) {
    this_im = this- > _get_IM( ) ;
    parent_key = this_im- > ptr_to_key( ) ;
    ckey = get this object's ckey within its IM;
    return strcat(parent_key,"/",ckey) ;
}
```

The implementation of _get_IM( ) could use any of several mechanisms. Some examples are:

A direct reference from within the object to its IM. This mechanism is simple and fast but costs a pointer per object.

A location-based service similar to what a single-level store uses. For example, a collection (or any other IM) might allocate a cache within a reserved address space range where all of its cached objects are kept. The service would have entries like begin_addr,end_addr,IM and would search these entries to find the IM that has the range containing the object's pointer. There could be multiple entries for the same IM to support multiple address-space ranges. This mechanism has no space overhead per object (there is a table entry per address-space range) but is somewhat slower. There are some simple index structures that make this search fast if the number of entries gets large.

The implementation of getting an object's ckey within its IM could use any of several mechanisms. Some examples are:

The simplest case is where the object's pointer is the ckey. One problem with this is that there is no way to return the correct "invalid reference" error for deleted objects.

Another technique is for the object to store its own ckey. This might be a good technique for element objects in IM that is a keyed collection where the ckey is the database record key, because it is already part of the object's state.

Another technique is a table that has an entry per object containing:

ckey,pointer which is indexed on both ckey and pointer. There are many variations on this. A simple technique is:

Because the entries are fixed-length, make the ckey space dense and use an array-like structure where the ckey is not stored but is an index into the array. The array can be extendable in size as needed. Each entry would contain just a pointer. To support the correct "invalid reference" error for deleted objects, either a flag could be included to indicate whether the ckey was valid or a special address (e.g., all 1s) or segment could indicate this. A hash table or B-tree could be used to access the entry via the pointer. This technique is similar to the Smalltalk oop table.

ODI has its own technique for this, which just uses that object's offset within a heap. The IM_ODI just calls the ODI runtime to find the ckey.

It will be appreciated that although a specific embodiment of the present invention has been described herein for the purposes of illustration, various modifications may be made without departing from the spirit or scope of the invention.

Accordingly, the scope of this invention is limited only by the following claims and their equivalents.

What is claimed is:

1. A computer implemented extensible method for enabling an object adapter to manage objects of an object class, said object adapter having an extensible instance manager, comprising the steps of:

receiving an object request message;

causing said instance manager to locate or activate an object if said object request message includes an object key and class;

causing an object request broker to invoke a method on a found or activated object if a first parameter is not a first value; and directly invoking said method if said first parameter is said first value.

2. The method of claim 1, wherein said first parameter is an object type and wherein the step of causing the instance manager to locate an object reference includes the steps of:

parsing said object key into component keys;

recursively determining an object type for each of said component keys; and returning an object reference and object type.

3. The method of claim 1, further comprising the step of:

converting a return method call into a return message.

* * * * *